(12) United States Patent
Kamran et al.

(10) Patent No.: US 11,593,162 B2
(45) Date of Patent: Feb. 28, 2023

(54) TECHNIQUES FOR SCHEDULING BETWEEN APPLICATIONS ON A CORE

(71) Applicant: EMC IP Holding Company LLC, Hopkinton, MA (US)

(72) Inventors: Lior Kamran, Richon LeZion (IL); Amitai Alkalay, Kadima (IL); Liran Loya, Hod Hasharon (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 130 days.

(21) Appl. No.: 17/074,951

(22) Filed: Oct. 20, 2020

(65) Prior Publication Data

US 2022/0121484 A1    Apr. 21, 2022

(51) Int. Cl.
*G06F 9/46* (2006.01)
*G06F 9/48* (2006.01)

(52) U.S. Cl.
CPC ............ *G06F 9/4881* (2013.01); *G06F 9/485* (2013.01)

(58) Field of Classification Search
CPC ................................ G06F 9/4881; G06F 9/485
See application file for complete search history.

(56) References Cited

U.S. PATENT DOCUMENTS

| | | | |
|---|---|---|---|
| 9,792,137 B2* | 10/2017 | Lee | G06F 9/45558 |
| 10,671,453 B1 | 6/2020 | Kamran et al. | |
| 10,678,480 B1 | 6/2020 | Armangau et al. | |
| 11,005,970 B2 | 5/2021 | Kamran et al. | |
| 2005/0041692 A1* | 2/2005 | Kallstenius | H04J 3/0667 370/503 |
| 2008/0172573 A1* | 7/2008 | Jansson | G06F 11/2035 714/15 |
| 2017/0149630 A1* | 5/2017 | Feller | H04L 41/5054 |
| 2017/0353712 A1* | 12/2017 | Price | G01S 17/18 |

OTHER PUBLICATIONS

Nagahara, Masaaki ; Quevedo, Daniel E ; Nesic, Dragan; Maximum Hands-Off Control: A Paradigm of Control Effort Minimization; 016, vol. 61 (3), p. 735-747.*

* cited by examiner

*Primary Examiner* — Camquy Truong
(74) *Attorney, Agent, or Firm* — BainwoodHuang

(57) ABSTRACT

A method of managing operation of a computing device is provided. The method includes (a) running a system scheduler that schedules execution of a first application and a second application on a central processing unit (CPU) core of the computing device; (b) while the first application is executing on the core, detecting, by the first application, a context-switch opportunity; and (c) issuing, by the first application in response to detecting the context-switch opportunity, a blocking operation that triggers the system scheduler to perform a rescheduling operation between the first and second applications on the CPU core. An apparatus, system, and computer program product for performing a similar method are also provided.

15 Claims, 5 Drawing Sheets

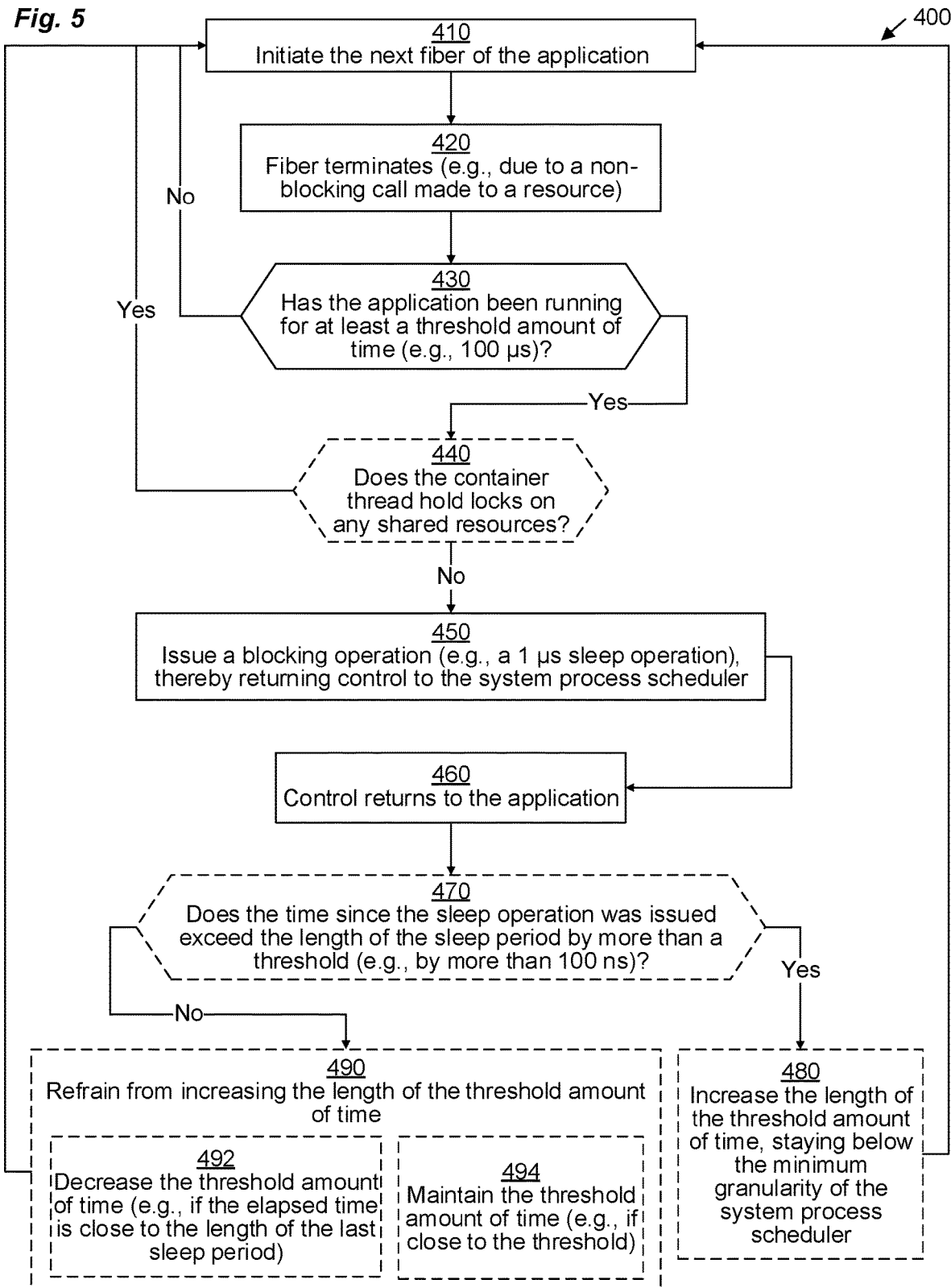

TECHNIQUES FOR SCHEDULING BETWEEN APPLICATIONS ON A CORE

BACKGROUND

Data storage systems are arrangements of hardware and software in which storage processors are coupled to arrays of non-volatile storage devices, such as magnetic disk drives, electronic flash drives, and/or optical drives. The storage processors service storage requests arriving from host machines ("hosts"), which specify blocks, files, and/or other data elements to be written, read, created, deleted, etc. Software running on the storage processors manages incoming storage requests and performs various data processing tasks to organize and secure the data elements on the non-volatile storage devices.

Some storage systems provide solely block-based storage processing, meaning that they provide access to data at particular block addresses of logical disks. These systems are often used in conjunction with other systems that provide a filesystem on top of the logical disks exposed by the data storage systems. Other storage systems provide solely file-based storage, exposing only filesystems to users. Yet other storage systems are able to provide both block-based and file-based storage to users.

SUMMARY

Some multi-core block-based storage systems assign particular processing cores to perform block-based storage operations. In one arrangement, a block-based storage processing application includes a large number of parallel lightweight threads (or "fibers") that run across several cores. A single container thread runs on each core, and that container thread is configured to process some of those fibers one after another. The block-based storage processing application runs in polling mode, which means that its fibers terminate upon issuing non-blocking calls to resources, and then fibers are respectively initiated to poll each resource for completion. Because the block-based storage processing application operates in polling mode, each fiber operates for a very short amount of time, but many fibers exist to poll various storage interfaces and other resources. These polling fibers are executed repeatedly to allow for minimal latency.

Such operation works well to provide low latency when the block-based storage processing application is the only application running on a core. However, it is possible that one or more other applications could be assigned to run on the same core or cores as the block-based storage processing application. For example, a file-based storage application may also run on the same core or cores. When that happens, the system scheduler (e.g., the Completely Fair Scheduler, CFS, of Linux) will alternate between the block-based storage processing application on a core and any other applications running on that core. Because the block-based storage processing application operates in polling mode and normally does not execute blocking operations, the block-based storage processing application will tend to run for the entire time allotted to it by the system scheduler. However, since the other applications may not operate in polling mode, they are more likely to issue blocking operations, which will cause their scheduled execution time to expire early. Thus, the block-based storage processing application will tend to dominate the processing resources even if the other applications need to run more urgently. In addition, because the system scheduler is not aware of the internal details of the block-based storage processing application, it will switch away from the block-based storage processing application at scheduled times even if the block-based storage processing application is in the middle of an important operation, such as accessing a resource with a lock such as a mutex. This may be problematic because if the other fibers of the block-based storage processing application executing on other container threads (or, possibly, other applications) try to access the same resource, they will not be able to do so until the mutex is released after operation returns back to the block-based storage processing application.

Thus, it would be desirable to allow the block-based storage processing application to give up its scheduled execution time slice at opportune times more frequently than the system scheduler changes the scheduling. Since a system scheduler (e.g., CFS) typically operates at a minimum granularity in the range of 1 to 4 milliseconds (ms), the block-based storage processing application should attempt to find a context-switch opportunity more frequently than the minimum granularity of the system scheduler and then issue a blocking operation (e.g., a sleep operation) to force the system scheduler to re-evaluate the scheduling for the core. This technique allows the other application (e.g., the file application) to have a better chance to execute more often when needed, and it also prevents the block-based storage processing application from being preempted at inopportune times. Similar techniques may also be used for any application that operates in polling mode.

In one embodiment, a method of managing operation of a computing device is provided. The method includes (a) running a system scheduler that schedules execution of a first application and a second application on a central processing unit (CPU) core of the computing device; (b) while the first application is executing on the core, detecting, by the first application, a context-switch opportunity; and (c) issuing, by the first application in response to detecting the context-switch opportunity, a blocking operation that triggers the system scheduler to perform a rescheduling operation between the first and second applications on the CPU core. An apparatus, system, and computer program product for performing a similar method are also provided.

The foregoing summary is presented for illustrative purposes to assist the reader in readily grasping example features presented herein. However, the foregoing summary is not intended to set forth required elements or to limit embodiments hereof in any way.

BRIEF DESCRIPTION OF THE SEVERAL VIEWS OF THE DRAWINGS

The foregoing and other features and advantages will be apparent from the following description of particular embodiments of the invention, as illustrated in the accompanying drawings, in which like reference characters refer to the same or similar parts throughout the different views.

FIG. 5 is a flowchart depicting an example procedure according to various embodiments.

DETAILED DESCRIPTION OF THE INVENTION

Embodiments are directed to techniques for allowing a polling-mode application (e.g., a block-based storage processing application) to give up its scheduled execution time slice at opportune times more frequently than the system scheduler changes the scheduling. Since a system scheduler (e.g., CFS) typically operates at a minimum granularity in the range of 1 to 4 microseconds (ms), the block-based storage processing application attempts to find a context-switch opportunity more frequently than the minimum granularity of the system scheduler and then issues a blocking operation (e.g., a sleep operation) to force the system scheduler to re-evaluate the scheduling for the core. This technique allows another application (e.g., a file application) to have a better chance to execute more often when needed, and it also prevents the block-based storage processing application from being preempted at inopportune times.

Figure 1:
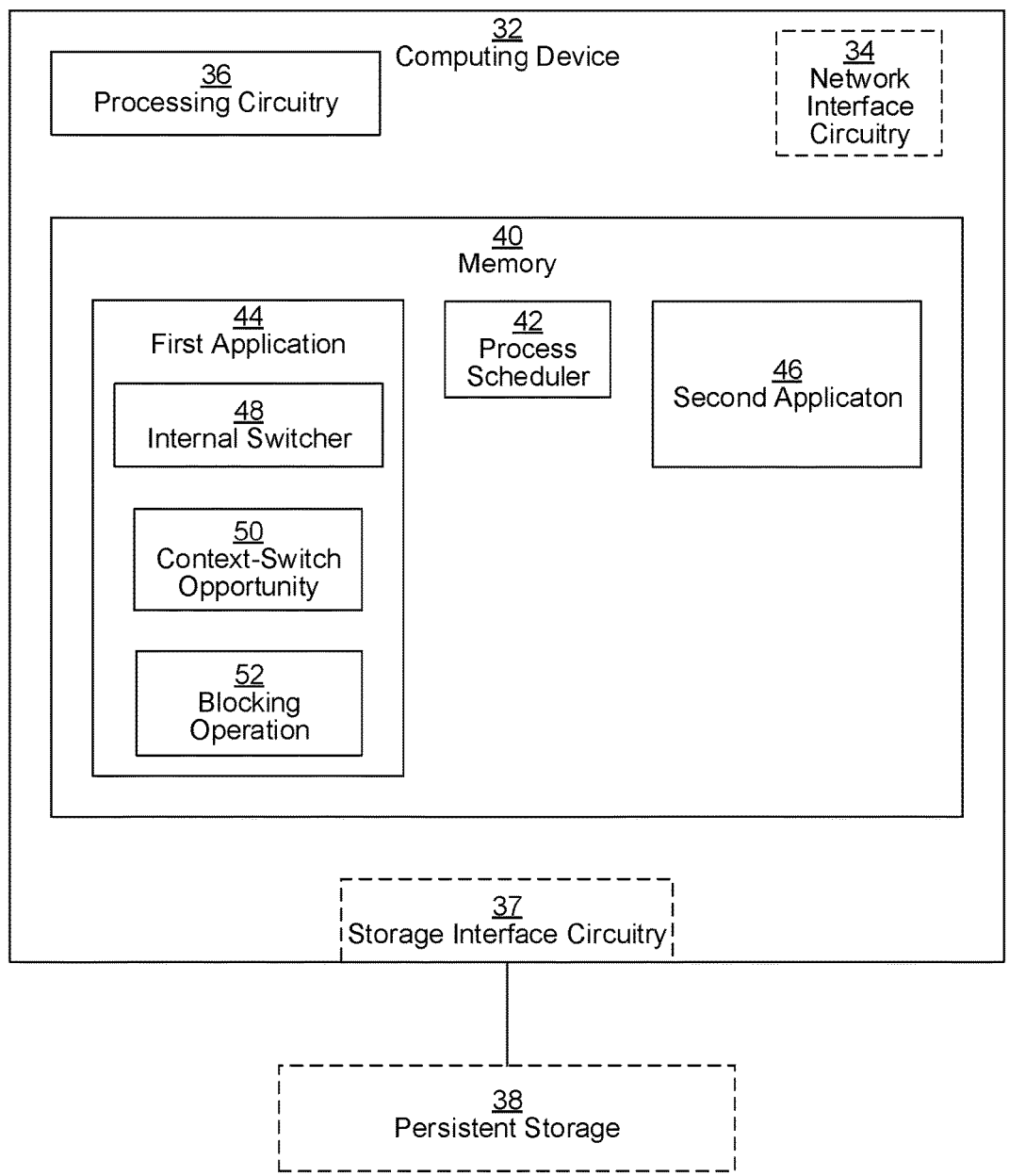
FIG. 1 is a block diagram depicting an example system, apparatus, and data structure arrangement for use in connection with various embodiments.

FIG. 1 depicts an example environment 30 for use in connection with various embodiments. Environment 30 includes a computing device 32. Computing device 32 may be any kind of computing device, such as, for example, a personal computer, workstation, server computer, enterprise server, data storage array device, laptop computer, tablet computer, smart phone, mobile computer, etc. In one example embodiment, each node 32 is a data storage array server.

Computing device 32 includes processing circuitry 36 and memory 40. In some embodiments, computing device 32 connects to a network (not depicted) using network interface circuitry 34. In some embodiments, computing device 32 connects to persistent storage 38 using storage interface circuitry 37.

Processing circuitry 36 may include any kind of processor or set of processors configured to perform operations, such as, for example, a microprocessor, a multi-core microprocessor, a digital signal processor, a system on a chip, a collection of electronic circuits, a similar kind of controller, or any combination of the above.

Storage interface circuitry 37 controls and provides access to shared persistent storage 38. Storage interface circuitry 37 may include, for example, SCSI, SAS, ATA, SATA, FC, M.2, U.2, and/or other similar controllers and ports. Persistent storage 38 includes a plurality of non-transitory persistent storage devices (not depicted), such as, for example, hard disk drives, solid-state storage devices (SSDs), flash drives, etc.

Network interface circuitry 34 may include one or more Ethernet cards, cellular modems, Fibre Channel (FC) adapters, wireless networking adapters (e.g., Wi-Fi), and/or other devices for connecting to a network (not depicted), such as, for example, a LAN, WAN, SAN, the Internet, a wireless communication network, a virtual network, a fabric of interconnected switches, etc. Network interface circuitry 34 allows a node 32 to communicate with one or more remote host devices (not depicted) over the network. In some embodiments, computing device 32 is configured as a data storage server and receives data storage requests from remote host devices via the network interface circuitry 34 that are directed to persistent storage 38 for fulfillment.

Memory 40 may be any kind of digital system memory, such as, for example, random access memory (RAM). Memory 40 stores an operating system (OS) (not depicted) in operation (e.g., a Linux, UNIX, Windows, MacOS, or similar operating system). Memory 40 also stores a process scheduler 42, a first application 44, a second application 46, and other software modules (not depicted) which each execute on processing circuitry 36.

Process scheduler 42 is a software module which is configured to schedule various applications (including first application 44 and second application 46) for execution on processing circuitry 36. In some embodiments, process scheduler 42 may be part of a kernel (not depicted) of the OS.

In an example, the first application 44 is an application (e.g., a block-based storage application), which, in the normal course of operation does not issue blocking operations (or issues such operations only very rarely). In some embodiments, first application 44 may operate in polling mode. First application 44 includes an internal switcher 48 that is configured to detect a context-switch opportunity 50 during execution. A context-switch opportunity 50 is an opportune situation at which first application 44 may give up its execution slot so that process scheduler 42 may reschedule between the first application and the second application 46. For example, in one embodiment, a context-switch opportunity 50 may be a situation in which first application 44 does not hold a lock on any resource that may be needed by second application 46 (or, in some embodiments, that may be needed by any other application running on computing circuitry 36). In some embodiments, a context switch opportunity 50 may reflect any situation in which the first application 44 determines that it could sustain a context switch.

Internal switcher 48 is configured to issue a blocking operation 52 on behalf of the first application in response to detecting the context-switch opportunity 50. In one example embodiment, the blocking operation 52 issued in response to the context-switch opportunity 50 is a sleep operation, such as, for example, a 1 microsecond (μs) sleep operation. Since the first application 44 cannot proceed with execution immediately in response to a blocking operation 52, first application 44 gives up its execution time slice (see below in connection with FIGS. 4A-4B), and process scheduler 42 will then assign second application 46 (or another application) to run instead, if possible. However, if no other application is ready to run, then, immediately after the blocking operation completes (e.g., after the completion of 1 μs of sleeping), process scheduler 42 returns control back to the first application 44.

Second application 46 may be any application other than the first application 44. In some embodiments, second application 46 is a typical application that does not operate in polling mode, such as, for example, a file-based storage application configured to process file-level storage requests.

In some embodiments, first application 44 and/or second application 46 may be configured to run on more than one core of processing circuitry. In such embodiments, process scheduler 42 may schedule each core independently.

Memory 40 may also store various other data structures used by the OS, process scheduler 42, first application 44, second application 46, and various other applications and drivers. In some embodiments, memory 40 may also include a persistent storage portion (not depicted). Persistent storage portion of memory 40 may be made up of one or more persistent storage devices, such as, for example, magnetic disks, flash drives, solid-state storage drives, or other types of storage drives. Persistent storage portion of memory 40 or shared persistent storage 38 is configured to store programs and data even while the computing device 32 is powered off.

The OS, process scheduler 42, first application 44, second application 46, and various other applications and drivers are typically stored in this persistent storage portion of memory 40 or on shared persistent storage 38 so that they may be loaded into a system portion of memory 40 upon a system restart or as needed. The OS, process scheduler 42, first application 44, second application 46, and various other applications and drivers, when stored in non-transitory form either in the volatile portion of memory 40 or on shared persistent storage 38 or in persistent portion of memory 40, each form a computer program product. The processing circuitry 36 running one or more applications thus forms a specialized circuit constructed and arranged to carry out the various processes described herein.

Figure 2:
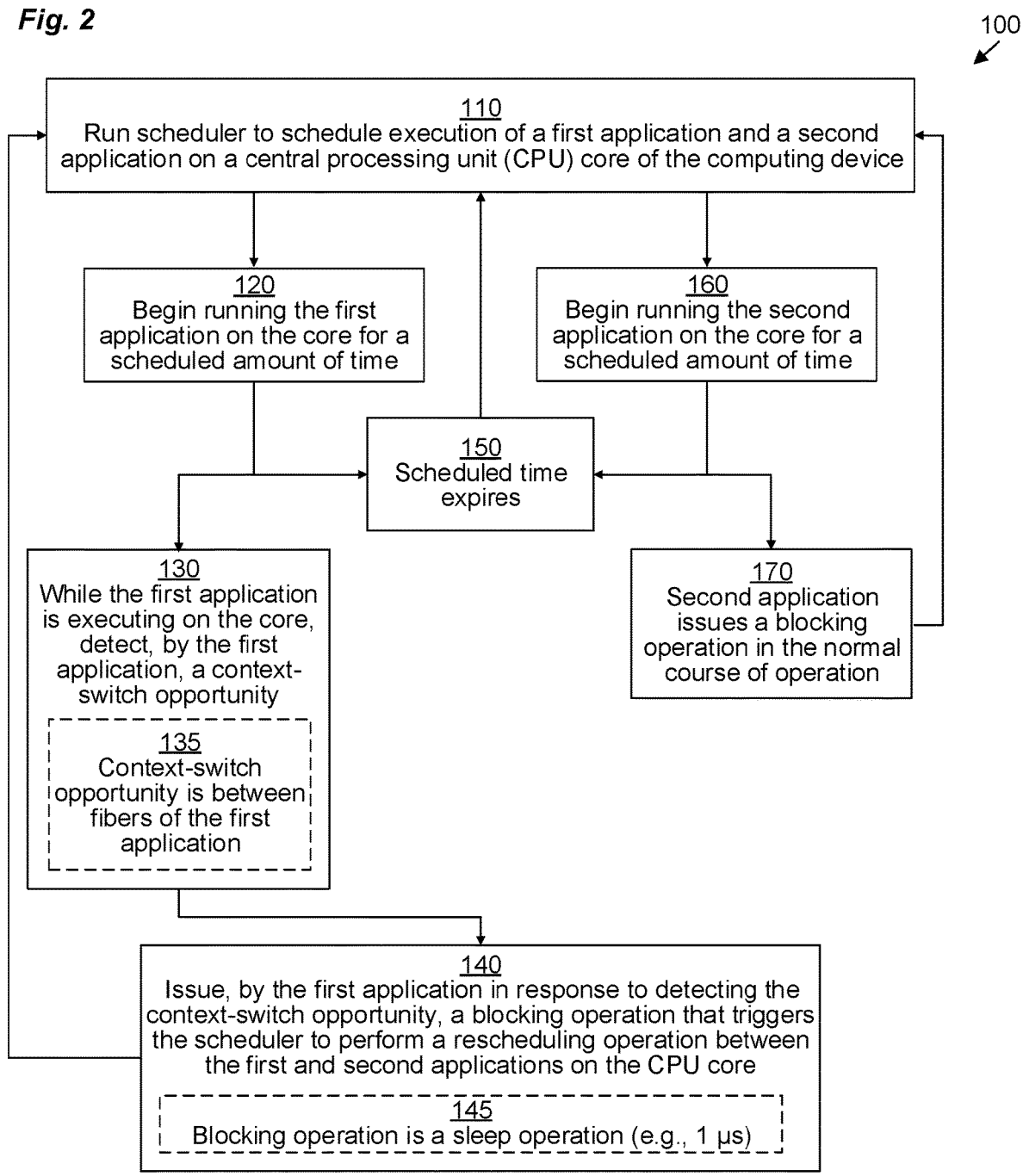
FIG. 2 is a flowchart depicting an example procedure according to various embodiments.

FIG. 2 illustrates an example method 100 performed by computing device 32 for managing execution of first application 44 and second application 46 on a core of processing circuitry 36. It should be understood that any time a piece of software (e.g., OS, process scheduler 42, first application 44, second application 46, etc.) is described as performing a method, process, step, or function, what is meant is that a computing device (e.g., a computing device 32) on which that piece of software is running performs the method, process, step, or function when executing that piece of software on its processing circuitry 36. It should be understood that one or more of the steps or sub-steps of method 100 may be omitted in some embodiments. Similarly, in some embodiments, one or more steps or sub-steps may be combined together or performed in a different order. Dashed lines indicate that a step or sub-step is either optional or representative of alternate embodiments or use cases.

In step 110, computing device 32 runs the process scheduler 42 to schedule execution of the first application 44 and the second application 46 on a central processing unit (CPU) core (e.g., a core of processing circuitry 36) of the computing device 32. In one embodiment, process scheduler 42 may be the Completely Fair Scheduler (CFS) of the Linux OS. In some embodiments, process scheduler 42 schedules one application (e.g., first application 44) for execution for 10 ms followed by 10 ms assigned to another application (e.g., second application 46). If more than two applications are to be scheduled, then process scheduler 42 may divide a target latency period (e.g., 20 ms) into several time slices of equal length, assigning one to each application. In some embodiments, the shortest time slice that can be assigned to any application is known as the minimum granularity period (MGP)—the MGP may be, for example, within a range of 1 ms to 4 ms, depending on the embodiment.

Following step 110, either the first application 44 is executed for up to the length of its assigned time slice (step 120) or the second application 46 is executed for up to the length of its assigned time slice (step 160). For both the first application 44 and the second application 46, if the time slice expires in step 150 (i.e., the application 44, 46 executes for the entire duration of its assigned time slice in step 120 or 160), operation returns back to step 110, and the process scheduler 42 proceeds to initiating the other application. For example, a typical order of operations if no blocking operations are ever issued might be step 110, followed by 120, followed by 150, followed by 110, followed by 160, followed by 150, followed by 110.

On the other hand, if during execution of second application 46, second application 46 happens to issue a blocking operation in the normal course of operation (step 170), operation returns back to step 110 prior to termination of the assigned time slice for the second application 46. Then, in step 110, process scheduler 42 may reschedule between the two applications 44, 46, initiating a new target latency period.

In some embodiments, as depicted, first application 44 does not issue blocking operations in the normal course of operation. However, in step 130, while the first application 44 is executing, if internal switcher 48 detects a context-switch opportunity 50, then operation proceeds with step 140, in which the internal switcher 48 issues a blocking operation 52 that triggers the system process scheduler 42 to perform a rescheduling operation between the first and second applications 44, 46. Then, in step 110, process scheduler 42 may reschedule between the two applications 44, 46, initiating a new target latency period.

In some embodiments, step 130 includes sub-step 135 in which the internal switcher 48 detects the context-switch opportunity 50 in between threads or fibers (i.e., lightweight threads that are executed within a container thread using cooperative multitasking) of the first application 44. Thus, after a fiber of the first application 44 finishes executing, the internal switcher 48 may detect the context-switch opportunity 50, so that it moves on to step 140 instead of initiating a next fiber of the first application 44.

In some embodiments, step 140 includes sub-step 145 in which initiating the blocking operation 52 includes initiating a sleep operation. For example, in one embodiment, the sleep operation may be a 1 microsecond (μs) sleep operation.

Figure 3:
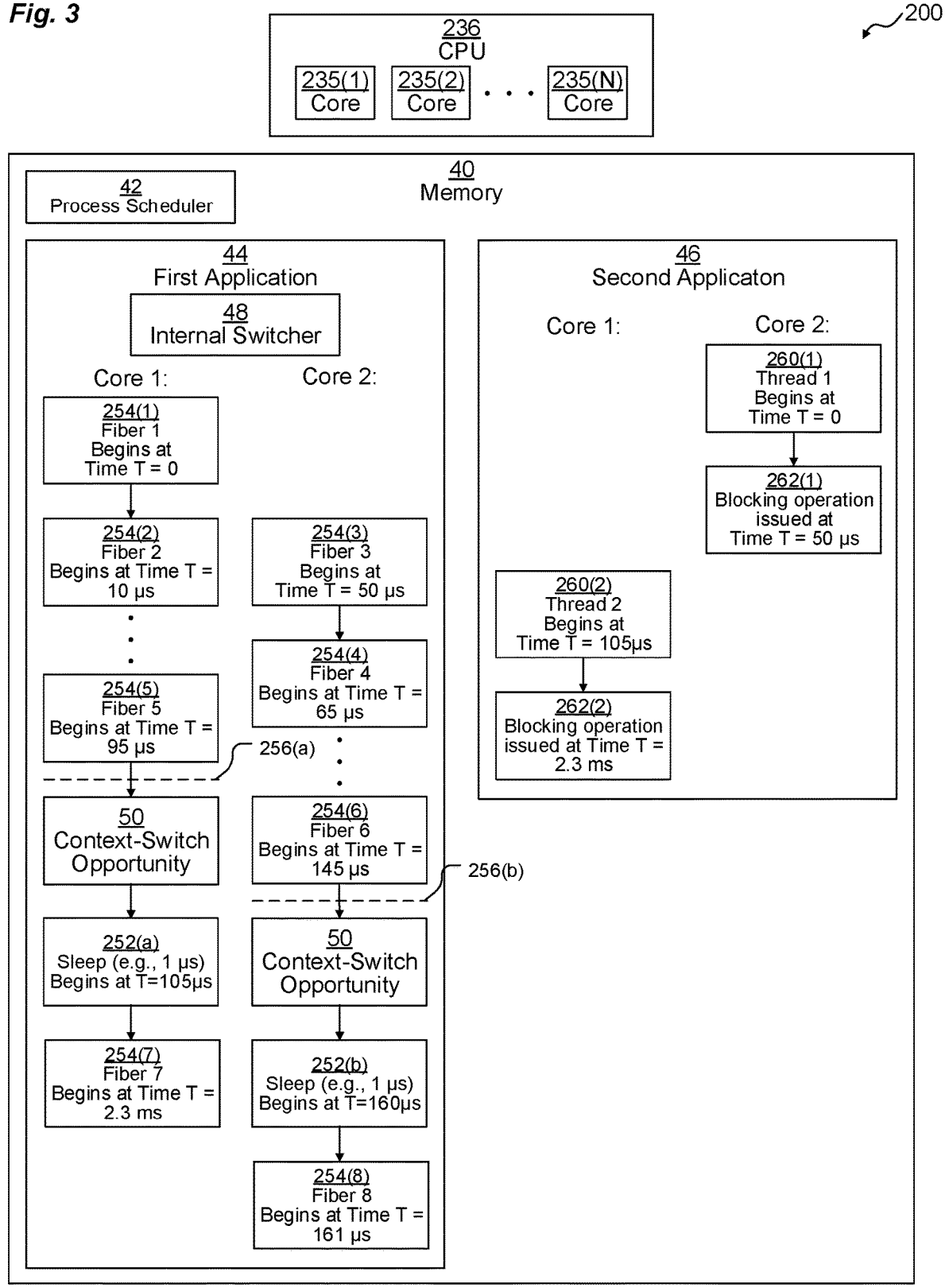
FIG. 3 is a block diagram depicting an example apparatus and data structure arrangement for use in connection with various embodiments.

FIG. 3 depicts an example arrangement 200 of computing device 32, with a focus on data structures. Processing circuitry 36 is depicted as a CPU 236 that includes a plurality of cores 235 (depicted as cores 235(1), 235(2), . . . , 235(N)). As depicted, first application 44 and second application 46 are both assigned to operate on both core 235(1) (also called "Core 1") and core 235(2) (also called "Core 2"). As depicted, process scheduler 42 initially schedules the first application 44 to run on core 1 for 10 ms and the second application 46 to run on core 2 for 10 ms.

In some embodiments, as depicted, first application 44 includes multiple fibers 254 that each run for short amounts of time (e.g., approximately 5-25 us each) within a container thread (not depicted) of the first application 44. In some embodiments, first application 44 includes several container threads, each of which executes on a different core 235. In some embodiments, some of the fibers 254 are polling fibers that poll particular interfaces or resources for responses, possibly initiating other fibers 254 in response. Internal switcher 48 assigns particular fibers 254 that are awaiting execution to particular cores 235 for serial execution on each core 235. In some embodiments, each container thread has its own respective internal switcher 48, and that internal switcher 48 schedules operation of various fibers 254 of the first application 44 within that container thread. Thus, fiber 254(1) begins executing on core 1 at time T=0, completing at time T=10 μs. Then, internal switcher 48 assigns the next available fiber, fiber 254(2) to run on core 1 at time T=10 μs. This continues for a while, with fiber 254(5) beginning at time T=95 us and completing at time T=105 μs.

First application 44 may be configured with a threshold execution time 256. For example, threshold execution time 256 may be for example, 100 μs. In some embodiments, the threshold execution time 256 is variable, with a default value of, for example, 100 μs. As depicted, the current threshold 256(a) for core 1 is 100 μs. Once the first application 44 has been executing continuously within its time slot on core 1 for the current threshold 256(a), internal switcher 48 attempts to detect a context-switch opportunity 50. As depicted, internal switcher 48 detects a context-switch opportunity 50 on core 1 at time T=105 µs, and, in response, it immediately issues a sleep operation 252(a) on core 1. As depicted, sleep operation 252(a) has a duration of 1 µs. Because a sleep operation is a blocking operation, first application 44 gives up its time slice on core 1, returning operation to the process scheduler 42. Process scheduler 42 is then able to schedule the second application 46 to execute for 10 ms on core 1.

As depicted, a thread 260(2) of the second application 46 begins executing at time T=105 us on core 1. As depicted, thread 260(2) happens to issue a blocking operation 262(2) at time T=2.3 ms. Second application 46 thus gives up its time slice on core 1, returning operation to the process scheduler 42. Process scheduler 42 is then able to schedule the first application 44 to execute for 10 ms on core 1. In response, fiber 254(7) of first application 44 begins executing at time T=2.3 ms on core 1.

Also as depicted, a thread 260(1) of the second application 46 begins executing on core 2 at time T=0. As depicted, thread 260(1) happens to issue a blocking operation 262(1) at time T=50 µs. Second application 46 thus gives up its time slice on core 2, returning operation to the process scheduler 42. Process scheduler 42 is then able to schedule the first application 44 to execute for 10 ms on core 2. In response, internal switcher 48 assigns the next available fiber 254, fiber 254(3) of first application 44, to begin executing at time T=50 us on core 2, completing at time T=65 µs. Then, internal switcher 48 assigns the next available thread, fiber 254(4) to run on core 2 at time T=65 µs. This continues for a while, with fiber 254(6) beginning at time T=145 us and completing at time T=160 µs.

As depicted, the current threshold 256(b) for core 2 is 100 µs. Once the first application 44 has been executing continuously within its time slot on core 2 for the current threshold 256(b), internal switcher 48 attempts to detect a context-switch opportunity 50. As depicted, internal switcher 48 detects a context-switch opportunity 50 on core 2 at time T=160 µs, and, in response, it immediately issues a sleep operation 252(b) on core 2. As depicted, sleep operation 252(b) has a duration of 1 µs. Because a sleep operation is a blocking operation, first application 44 gives up its time slice on core 2, returning operation to the process scheduler 42. Process scheduler 42 is then able to determine that the second application 46 is not ready to run on core 2, so, at the end of the 1 µs sleep operation 252(b), process scheduler 42 is able to again schedule the first application 44 to execute for 10 ms on core 2. In response, internal switcher 48 assigns the next available thread, fiber 254(8) of first application 44 to begin executing at time T=161 us on core 2.

Figure 4A:
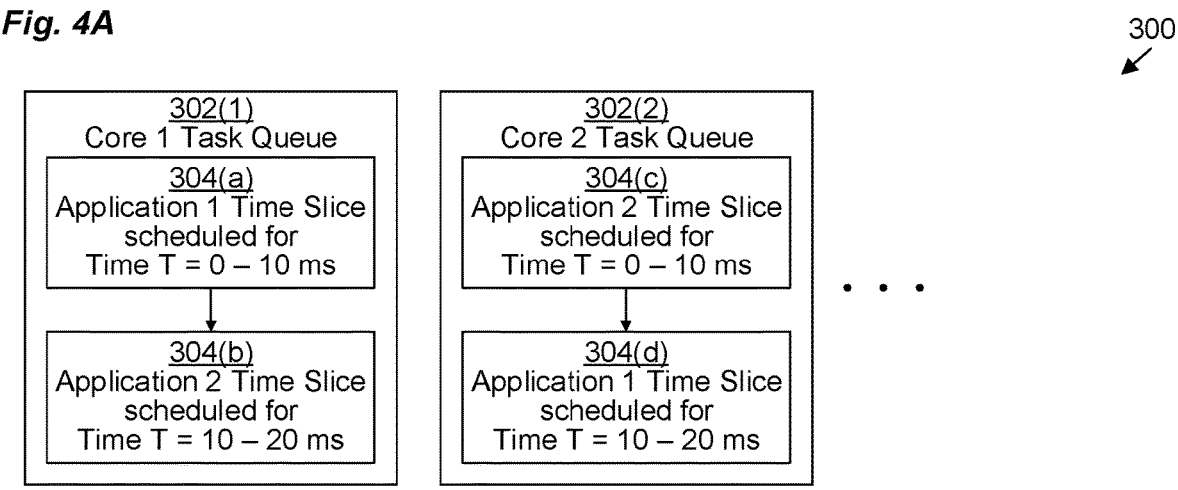
FIGS. 4A and 4B are block diagrams depicting example data structure arrangements for use in connection with various embodiments.

FIG. 4A depicts an example data structure arrangement 300. Arrangement 300 represents a set of task queues 302 for individual cores 235 at time T=0 in the arrangement 200 of FIG. 3. Task queue 302(1) represents core 1, and task queue 302(2) represents core 2. Given a target latency period of 20 ms and two applications 44, 46 to schedule on each core 235(1), 235(2), process scheduler 42 assigns two consecutive 10 ms time slices 304 in each task queue 302. Thus core 1 task queue 302(1) has a first 10 ms time slice 304(a) that schedules the first application 44 to run on core 1 from time T=0 until time T=10 ms and a second 10 ms time slice 304(b) that schedules the second application 46 to run on core 1 from time T=10 ms until time T=20 ms. Similarly, core 2 task queue 302(2) has a first 10 ms time slice 304(c) that schedules the second application 46 to run on core 2 from time T=0 until time T=10 ms and a second 10 ms time slice 304(d) that schedules the first application 44 to run on core 2 from time T=10 ms until time T=20 ms.

Figure 4B:
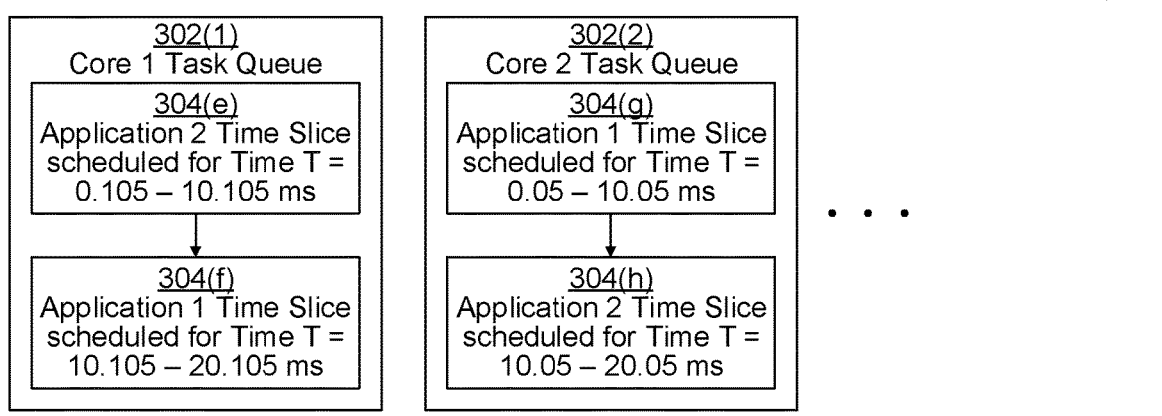

FIG. 4B depicts a related example data structure arrangement 300' that represents the same set of task queues 302 in the context of arrangement 200 of FIG. 3 but at a later point in time T=105 µs. Thus core 1 task queue 302(1) has a first 10 ms time slice 304(e) that schedules the second application 46 to run on core 1 from time T=0.105 ms until time T=10.105 ms and a second 10 ms time slice 304(f) that schedules the first application 44 to run on core 1 from time T=10.105 ms until time T=20.105 ms. Similarly, core 2 task queue 302(2) has a first 10 ms time slice 304(g) that schedules the first application 44 to run on core 2 from time T=0.05 ms until time T=10.05 ms and a second 10 ms time slice 304(h) that schedules the second application 46 to run on core 2 from time T=10.05 ms until time T=20.05 ms.

FIG. 5 depicts a method 400 performed by internal switcher 48 of first application 44 on a particular core 235(Y). It should be understood that one or more of the steps or sub-steps of method 400 may be omitted in some embodiments. Similarly, in some embodiments, one or more steps or sub-steps may be combined together or performed in a different order. Dashed lines indicate that sub-steps are either optional or representative of alternate embodiments or use cases.

In step 410, internal switcher 48 initiates, within a container thread of the first application 44 running on core 235(Y), the next fiber 254(X) of first application 44 that is awaiting execution. Then, in step 420, that fiber 254(X) completes. For example, fibers 254(X) may issue a non-blocking read to a particular resource, which causes that fiber 254(X) to terminate.

In response, in step 430, internal switcher 48 determines whether or not the first application 44 (or, more precisely, the container thread of the first application 44 running on core 235(Y)) has been running on the core 235(Y) for at least a threshold amount of time (e.g., 100 us by default). If not, then operation returns back to step 410, proceeding with the next available fiber 254 of first application 44 on core 235(Y). Otherwise, operation proceeds with optional step 440, or, in some embodiments, step 450. The threshold amount of time (e.g., 100 µs) is chosen to be significantly shorter than the MGP of the system process scheduler 42 (for example, 100 us is significantly shorter than a minimum granularity of 1 ms). This design ensures that the container thread of the first application 44 should normally never run straight on core 235(Y) for the entire duration of the MGP, which means that the internal switcher 48 should (almost) always be able to decide when first application 44 gives up control, preventing a situation in which the container thread of the first application 44 running on core 235(Y) loses its time slot while it has a lock on a shared resource.

In some embodiments, the threshold amount of time is a fixed value, for example within a range of 25 us to 900 µs, but in any event, the fixed value should be shorter than the MGP of the system process scheduler 42. As another example, the threshold amount of time is fixed within a range of 2.5% to 90% of the length of the MGP.

In other embodiments, the threshold amount of time is variable with a default pre-selected value within a range of 50 µs to 250 µs, for example. As another example, the default pre-selected value is 5% to 25% of the length of the MGP. In such embodiments, the threshold amount of time may be increased up to a maximum value of, for example, 900 µs or 90% of the length of the MGP. In some of these embodiments, the threshold amount of time may also be decreased down to a minimum value of, for example, 25 µs or 2.5% of the length of the MGP. See below in connection with steps 470-494 for more detail about how the threshold amount of time may be increased or decreased.

In step 440, which may be omitted in some embodiments, internal switcher 48 determines whether or not the container thread of the first application 44 running on core 235(Y) holds any locks on any resources shared with either (a) another container thread of the first application 44 running on a different core 235 or (b) other applications (e.g., second application 46) running on processing circuitry 36. If so, then operation returns back to step 410, proceeding with the next available fiber 254 of first application 44, which provides an opportunity for the lock on the resource to be released. Otherwise, operation proceeds with step 450.

Proceeding to step 450 indicates that a context-switch opportunity 50 has been found (see step 130 of FIG. 2). Thus, in method 400, an affirmative result from step 430 (as well as a negative result from step 440 in embodiments in which it is performed) indicates a context-switch opportunity 50.

In step 450, internal switcher 48 issues a blocking operation on core 235(Y) (e.g., a sleep operation of a particular duration, such as, for example, 1 μs), thereby returning control flow to the process scheduler 42, allowing the process scheduler 42 to alter the time slots 304. Process scheduler 42 may transfer operation to another application on core 235(Y), if one is ready to run, and eventually operation will return back to the container thread of the first application 44 running on core 235(Y). Otherwise, when the blocking operation completes (e.g., at the end of the sleep period), operation returns back to the container thread of the first application 44 running on core 235(Y).

In step 460, control returns back to the container thread of the first application 44 running on core 235(Y). In some embodiments, operation proceeds directly back to step 410, proceeding with the next available fiber 254 of first application 44. In other embodiments, steps 470-490 may be performed.

In step 470, which may be omitted in some embodiments, internal switcher 48 determines whether the amount of time since issuing the sleep operation (in step 450) exceeds the length of the sleep operation by more than an excess threshold (e.g., 100 ns). Thus, for example, for a sleep period of 1 μs, if the elapsed time has been more than 1.1 μs, then operation proceeds to step 480; otherwise, operation proceeds with step 490.

In step 480, internal switcher 48 increases the length of the threshold amount of time (see step 430), staying below the MGP of the process scheduler 42. Thus, for example, if the threshold amount of time is at the default value of 100 μs, internal switcher 48 may increase the threshold amount of time by 25 μs to 125 μs. If the threshold amount of time is already above the default value (e.g., it is set to 125 μs), internal switcher 48 may increase the threshold amount of time by a further 25 μs (e.g., to 150 μs). This may continue until the threshold amount of time reaches a value approaching the MGP. Thus, for example, if the MGP is 1 ms, the threshold amount of time may continue to increase up to a maximum value of 900 μs.

In step 490, internal switcher 48 refrains from increasing the length of the threshold amount of time. In some embodiments, step 490 may include sub-steps 492, 494.

In sub-step 492, if the elapsed time is close to the length of the sleep period (e.g., within 20 ns, so if the elapsed time is less than 1.02 μs), then internal switcher 48 decreases the length of the threshold amount of time. Thus, for example, if the threshold amount of time is at the default value of 100 μs, internal switcher 48 may decrease the threshold amount of time by 25 μs to 75 μs. If the threshold amount of time is already below the default value (e.g., it is set to 75 μs), internal switcher 48 may decrease the threshold amount of time by a further 25 μs (e.g., to 50 μs). This may continue until the threshold amount of time reaches a value approaching zero. Thus, for example, the threshold amount of time may continue to decrease down to a minimum value of 25 μs. If the threshold amount of time is already above the default value (e.g., it is set to 175 μs), internal switcher 48 may decrease the threshold amount of time by 25 μs (e.g., to 150 μs).

In sub-step 494, if the elapsed time is an intermediate length (e.g., more than 1.02 μs but less than 1.1 μs), then the threshold amount of time is maintained without change.

Thus, techniques have been presented for allowing a polling-mode application 44 (e.g., a block-based storage processing application) to give up its scheduled execution time slice 304 at opportune times (e.g., at a context-switch opportunity 50) more frequently than the system scheduler 42 changes the scheduling. Since a system scheduler 42 (e.g., CFS) typically operates at a minimum granularity in the range of 1 to 4 microseconds (ms), the block-based storage processing application 44 attempts to find a context-switch opportunity 50 more frequently than the MGP of the system scheduler 42 and then issues a blocking operation 52 (e.g., a sleep operation) to force the system scheduler 42 to re-evaluate the scheduling for the core 235. This technique allows another application 46 (e.g., a file application) to have a better chance to execute more often when needed, and it also prevents the block-based storage processing application 44 from being preempted at inopportune times.

As used throughout this document, the words "comprising," "including," "containing," and "having" are intended to set forth certain items, steps, elements, or aspects of something in an open-ended fashion. Also, as used herein and unless a specific statement is made to the contrary, the word "set" means one or more of something. This is the case regardless of whether the phrase "set of" is followed by a singular or plural object and regardless of whether it is conjugated with a singular or plural verb. Further, although ordinal expressions, such as "first," "second," "third," and so on, may be used as adjectives herein, such ordinal expressions are used for identification purposes and, unless specifically indicated, are not intended to imply any ordering or sequence. Thus, for example, a "second" event may take place before or after a "first event," or even if no first event ever occurs. In addition, an identification herein of a particular element, feature, or act as being a "first" such element, feature, or act should not be construed as requiring that there must also be a "second" or other such element, feature, or act. Rather, the "first" item may be the only one. In addition, an identification herein of a particular element, feature, or act as being a "first" such element, feature, or act and another particular element, feature, or act as being a "second" such element, feature, or act should be construed as requiring that the "first" and "second" elements, features, or acts are different from each other, unless specified otherwise. Although certain embodiments are disclosed herein, it is understood that these are provided by way of example only and that the invention is not limited to these particular embodiments.

While various embodiments have been particularly shown and described, it will be understood by those skilled in the art that various changes in form and details may be made therein without departing from the spirit and scope of the appended claims.

For example, although various embodiments have been described as being methods, software embodying these methods is also included. Thus, one embodiment includes a tangible non-transitory computer-readable storage medium (such as, for example, a hard disk, a floppy disk, an optical disk, flash memory, etc.) programmed with instructions, which, when performed by a computer or a set of computers, cause one or more of the methods described in various embodiments to be performed. Another embodiment includes a computer that is programmed to perform one or more of the methods described in various embodiments.

Furthermore, it should be understood that all embodiments which have been described may be combined in all possible combinations with each other, except to the extent that such combinations have been explicitly excluded.

Finally, Applicant makes no admission that any technique, method, apparatus, or other concept presented in this document is prior art under 35 U.S.C. § 102 or 35 U.S.C. § 103, such determination being a legal determination that depends upon many factors, not all of which are known to Applicant at this time.

What is claimed is:

1. A method of managing operation of a computing device, the method comprising:
   running a system scheduler that schedules execution of a first application and a second application on a central processing unit (CPU) core of the computing device, the first application including an internal scheduler distinct from the system scheduler, executing the first application on the core including initiating, by the internal scheduler, a plurality of fibers of the first application on the core in series;
   while the first application is executing on the core, detecting, by the internal scheduler of the first application in response to termination of execution of one of the plurality of fibers of the first application on the core, a context-switch opportunity; and
   issuing, by the first application in response to detecting the context-switch opportunity, a blocking operation that triggers the system scheduler to perform a rescheduling operation between the first and second applications on the CPU core,
   wherein the system scheduler is configured with a minimum granularity period (MGP), the MGP being a shortest length of time that the system scheduler is able to schedule, and wherein detecting the context-switch opportunity is done upon executing the first application on the core for less than the MGP,
   wherein the one of the plurality of fibers is an initial fiber of the first application executing on the core that terminates at least a threshold amount of time after executing the first application on the core, the threshold amount of time being less than the MGP.

2. The method of claim 1,
   wherein the MGP is within a range of 1 millisecond (ms) to 4 ms; and
   wherein the threshold amount of time is within a range of 2.5% to 90% of the MGP.

3. The method of claim 1,
   wherein the threshold amount of time is variable;
   wherein the blocking operation is a sleep operation with a fixed sleep period; and
   wherein the method further comprises:
      after issuing the blocking operation, resuming execution of the first application on the core,
      upon resuming execution, checking an elapsed time since issuing the blocking operation, and
      in response to the elapsed time exceeding the fixed sleep period by more than an excess threshold, increasing the variable threshold amount of time.

4. The method of claim 3,
   wherein the MGP is within a range of 1 millisecond (ms) to 4 ms; and
   wherein the threshold amount of time has a default value within a range of 5% to 25% of the MGP.

5. The method of claim 1,
   wherein the first application is a storage processing application configured to process block-level storage requests; and
   wherein the plurality of fibers of the first application are polling fibers configured to poll storage resources managed by the storage processing application without issuing blocking operations.

6. The method of claim 5 wherein the second application is a storage processing application configured to process file-level storage requests.

7. The method of claim 5 wherein the second application does not operate in a polling mode, the second application being configured to issue blocking operations as part of reading and writing data.

8. The method of claim 1 wherein detecting the context-switch opportunity includes detecting that a container thread of the first application executing on the core does not hold a lock on any resource shared with another application running on the computing device or with another container thread of the first application executing on another core of the computing device.

9. The method of claim 1 wherein issuing the blocking operation includes issuing a sleep operation.

10. The method of claim 9 wherein the sleep operation has a period within a range of 250 nanoseconds to 5 microseconds.

11. The method of claim 1 wherein the context-switch opportunity is not triggered by a blocking operation of the first application.

12. A computer program product comprising a non-transitory computer-readable storage medium storing a set of instructions, which, when performed by a computing device, causes the computing device to:
   run a system scheduler that schedules execution of a first application and a second application on a central processing unit (CPU) core of the computing device, the first application including an internal scheduler distinct from the system scheduler, execution of the first application on the core including initiation, by the internal scheduler, of a plurality of fibers of the first application on the core in series;
   while the first application is executing on the core, detect, by the internal scheduler of the first application in response to termination of execution of one of the plurality of fibers of the first application on the core, a context-switch opportunity; and
   issue, by the first application in response to detecting the context-switch opportunity, a blocking operation that triggers the system scheduler to perform a rescheduling operation between the first and second applications on the CPU core,
   wherein the system scheduler is configured with a minimum granularity period (MGP), the MGP being a shortest length of time that the system scheduler is able to schedule, and wherein detecting the context-switch opportunity is done upon executing the first application on the core for less than the MGP, wherein the one of the plurality of fibers is an initial fiber of the first application configured to execute on the core that terminates at least a threshold amount of time after execution of the first application on the core, the threshold amount of time being less than the MGP.

13. The computer program product of claim 12 wherein detection of the context-switch opportunity includes detection that a container thread of the first application configured to execute on the core does not hold a lock on any resource shared with another application configured to run, on the computing device or with another container thread of the first application configured to execute on another core of the computing device.

14. The computer program product of claim 12 wherein issuance of the blocking operation includes issuance of a sleep operation.

15. An apparatus comprising:
a central processing unit (CPU) including at least one core; and
memory, the memory storing instructions, which, when performed by the core cause the core to:
run a system scheduler that schedules execution of a first application and a second application on the core, the first application including an internal scheduler distinct from the system scheduler, execution of the first application on the core including initiation, by the internal scheduler, of a plurality of fibers of the first application on the core in series;
while the first application is executing on the core, detect, by the internal scheduler of the first application in response to termination of execution of one of the plurality of fibers of the first application on the core, a context-switch opportunity; and
issue, by the first application in response to detecting the context-switch opportunity, a blocking operation that triggers the system scheduler to perform a rescheduling operation between the first and second applications on the core,
wherein the system scheduler is configured with a minimum granularity period (MGP), the MGP being a shortest length of time that the system scheduler is able to schedule, and wherein detection of the context-switch opportunity is done upon executing the first application on the core for less than the MGP,
wherein the one of the plurality of fibers is an initial fiber of the first application configured to execute on the core that terminates at least a variable threshold amount of time after execution of the first application on the core, the variable threshold amount of time being less than the MGP.

* * * * *